(12) United States Patent
Kobayashi et al.

(10) Patent No.: US 6,724,563 B2
(45) Date of Patent: Apr. 20, 2004

(54) TWO-STAGE ACTUATOR WITH SENSITIVITY FUNCTION PREVENTING DISTURBANCES AT ALL FREQUENCIES

(75) Inventors: Masahito Kobayashi, Ushiku (JP); Masaki Odai, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 09/790,634

(22) Filed: Feb. 23, 2001

(65) Prior Publication Data

US 2002/0012193 A1 Jan. 31, 2002

(30) Foreign Application Priority Data

Jun. 26, 2000 (JP) ......................................... 2000-196274

(51) Int. Cl.[7] ............................................. G11B 5/596
(52) U.S. Cl. ............................... 360/78.05; 360/77.02; 360/78.09
(58) Field of Search ................................ 360/75, 77.02, 360/77.08, 78.04, 78.05, 78.12, 78.14, 78.09; 369/43, 47.36, 47.49, 44.11, 44.25, 44.27, 44.28, 44.29

(56) References Cited

U.S. PATENT DOCUMENTS

| 4,963,806 | A | * | 10/1990 | Shinohara et al. | .......... 318/621 |
|---|---|---|---|---|---|
| 5,090,001 | A | * | 2/1992 | Ito et al. | .................. 369/44.28 |
| 5,452,275 | A | * | 9/1995 | Ogawa | ..................... 369/44.11 |
| 5,920,441 | A | * | 7/1999 | Cunningham et al. | ... 360/78.05 |
| 6,088,187 | A | * | 7/2000 | Takaishi | ................... 360/78.05 |
| 6,483,659 | B1 | | 11/2002 | Kobayashi et al. | |

FOREIGN PATENT DOCUMENTS

| JP | 5-198111 | 8/1993 |
|---|---|---|
| JP | 2000-132929 | 5/2000 |

* cited by examiner

*Primary Examiner*—Andrew L. Sniezek
(74) *Attorney, Agent, or Firm*—Antonelli, Terry, Stout & Kraus, LLP (57) ABSTRACT

By increasing the gain of a controller for coarse motion CFBV within a frequency band in which the gain of a sensitivity function SP=1/(1+PP·CFBP) of fine motion actuator DP and controller for fine motion CFBP exceeds 0 dB, the gain of a sensitivity function SV=1/(1+PP·CFBV) of coarse motion actuator PV and coarse motion controller CFBV is decreased. Through this, in a two-stage actuator control system, a disk apparatus can be provided in which a sensitivity function SPES=1/(1+PP·CFBP)·1/(1+PP·CFBV) indicative of a disturbance compressive ratio in a signal path ranging from disturbance components to a head position error signal is rendered to be 0 dB or less at all frequencies concerned.

6 Claims, 11 Drawing Sheets

SENSITIVITY FUNCTION OF COARSE MOTION LOOP :
WHEN FREQUENCY AXIS IS WITH LOGARITHMIC SCALE

FIG. 13B
(PRIOR ART)

SENSITIVITY FUNCTION OF COARSE MOTION LOOP :
WHEN FREQUENCY AXIS IS WITH LINEAR SCALE

TWO-STAGE ACTUATOR WITH SENSITIVITY FUNCTION PREVENTING DISTURBANCES AT ALL FREQUENCIES

BACKGROUND OF THE INVENTION

The present invention relates to disk apparatus and more particularly, to a disk apparatus for controlling a fine motion actuator of high response and small stroke and a coarse motion actuator of low response and large stroke by cooperating them with each other.

A technique of two-stage actuator has hitherto been known in which a coarse motion actuator constructed of a voice coil motor and a fine motion actuator constructed of, for example, piezoelectric devices are used in combination to position a magnetic head with high accuracy. For example, JP-A-4-368676 discloses a positioning control technique for realizing the high bandwidth of a control system by cooperating a coarse motion actuator control system with a fine motion actuator control system.

The disclosure of JP-A-4-368676 is, however, limited to only the structure of the two-stage actuator control system and fails to give a description of a design technique of a control system suitable for high bandwidth of the control system.

The magnetic disk has been increased in density year by year and speed-up of disk rotation leads to the need to increase the data transfer speed. At present, the disk rotation is of about 7200 rpm but in future, the advent of an apparatus having a disk rotation speed exceeding 12000 rpm will be expected. As the disk rotation speed increases, the frequency region in which there exist error components of disturbance components, especially position disturbance DD attributable to disk flutter and windage disturbance is broadened. Presently, a position disturbance for the 7200 rpm disk rotation exists at frequencies of about 500 Hz to 2 kHz and therefore, in the case of a control system having a band of 500 Hz, the position disturbance is amplified. If the band is increased from 500 Hz to, for example, 2 kHz, then the position error disturbance can be compressed to a great extent. With the disk rotation speed increased, however, the frequency region of the position disturbance also increases. For example, in an apparatus having a disk rotation speed of 15000 rpm, the band increases from 2 kHz up to 4 kHz as well known in the art.

A two-stage actuator system designed in accordance with the two-stage actuator control system disclosed in JP-A-4-368676 has a sensitivity function (disturbance compressive characteristic) exhibiting a characteristic in which disturbances are compressed within a band of 2 kHz or less but conversely, the individual disturbances are amplified at frequencies of 2 kHz or more.

Consequently, even when the band is increased or raised in the conventional two-stage actuator control system, the frequency band within which the position disturbances are present increases as the disk rotation increases and the reduction of positioning error expected by the improved band cannot be realized. Conceivably, by improving the mechanical system, various disturbance components can be reduced but disadvantageously, such an expedient leads to an increase in costs of the apparatus.

Accordingly, the problem of highly accurate positioning technique in the two-stage actuator control system is important and must be solved.

SUMMARY OF THE INVENTION

A first object of the present invention is to provide disk apparatus and positioning control system which can realize a sensitivity function (disturbance suppressive characteristic) for preventing disturbances from being amplified at all frequencies concerned in a two-stage actuator system having a coarse motion actuator and a fine motion actuator.

A second object of the invention is to provide a system in which the fine motion actuator control system can be controlled by an analog circuit without causing lagging in operation in the two-stage actuator system. With this system, the sensitivity function (disturbance suppressive characteristic) of fine motion actuator control system capable of preventing the disturbances from being amplified at all of the frequencies can be realized. Further, even in the whole two-stage actuator control system, a sensitivity function capable of preventing the disturbances from being amplified at all of the frequencies can be realized.

According to the present invention, an ideal two-stage actuator control system capable of reducing disturbance components at all of the frequencies can be constructed so as to attain highly accurate positioning of the head. Through this, the track pitch distance can be narrowed and therefore, a large amount of data can be recorded on one disk surface, thereby increasing the capacity of the apparatus.

To accomplish the above objects, in a head positioning apparatus comprising a coarse motion actuator having a stroke for permitting a head for recording/reproduction of information to operate over the whole of a disk, a controller for coarse motion adapted to drive the coarse motion actuator, a fine motion actuator movable by the coarse motion actuator and having its stroke limited to a small value and a controller for fine motion adapted to drive the fine motion actuator, a position difference signal calculated by comparing a head position signal obtained through detection of the position of the head with a target position is fed back to both the coarse motion controller and the fine motion controller so as to partly increase the gain of the coarse motion controller within a frequency region exceeding a positioning control band of the fine motion actuator. Also, a gain characteristic of a sensitivity function indicative of a disturbance suppressive characteristic in a signal path ranging from the target position to the position difference signal is rendered to be 1.4 or less at all of the frequencies.

Further, where the coarse motion actuator is represented by PV, the coarse motion controller is represented by CFBV, the fine motion actuator is represented by PP and the fine motion controller is represented by CFBP, the gain of a sensitivity function $1/(1+PV \cdot CFBV)$ of coarse motion loop indicative of a disturbance compressive characteristic of the coarse motion actuator and coarse motion controller is rendered to be 1 or less within a frequency region in which the gain of a sensitivity function $1/(1+PP \cdot CFBP)$ of fine motion loop indicative of a disturbance compressive characteristic of the fine motion actuator and fine motion controller is 1 or more.

The apparatus further comprises means for detecting a displacement of the fine motion actuator and means for generating a continuous head position signal from a high-frequency component of the continuous displacement of the fine motion actuator and a low-frequency component of the discrete position difference signal, and the continuous head position signal is fed back to the fine motion controller. Also, a gain characteristic of a sensitivity function indicative of a disturbance suppressive characteristic in a signal path ranging from the target position to the position difference signal is rendered to be 1.4 or less at all of the frequencies.

Furthermore, a peak frequency of the sensitivity function indicative of the suppressive characteristic of the fine motion actuator and fine motion controller is rendered to be substantially coincident with a frequency of a main resonance peak of the coarse motion actuator.

Then, the apparatus further comprises means for making an operation quantity to the fine motion actuator zero, means for adding an output of the coarse motion controller and an output of coarse motion disturbance input means and means for measuring a sensitivity function indicative of a disturbance suppressive characteristic in a signal path ranging from a coarse motion disturbance input signal to a signal after the addition, and a gain characteristic of the measured sensitivity function of the coarse motion control system is rendered to be 1 or less within a low-frequency region and also within a high-frequency region.

DESCRIPTION OF THE EMBODIMENTS

In the present invention, a sensitivity function indicating a characteristic for compressing disturbances ranging from individual disturbance components to a head position error signal (a disturbance compressive characteristic) is noticed to provide a disk apparatus having a sensitivity function which is 0 dB or less at all frequencies concerned, that is, which is effective to prevent the disturbances from being amplified.

To facilitate understanding of technical problems encountered in the two-stage actuator control system, technical problems faced in the case of driving a head with only a voice coil motor serving as a coarse motion actuator will first be described. A coarse motion actuator feedback control system and disturbance signals applied to individual signals are illustrated in block diagram form in FIG. 12. In the figure, P 209 designates a mechanical system of coarse motion actuator representing an object to be controlled and C 206 designates a controller for driving the mechanical system. Force acting on the actuator in this system includes disturbance DF 207, vibratory disturbance DM 211 caused by the mechanical system, head position error disturbance DD 212 attributable to disk vibration and windage turbulence and detection noise DN 204.

Figure 12:
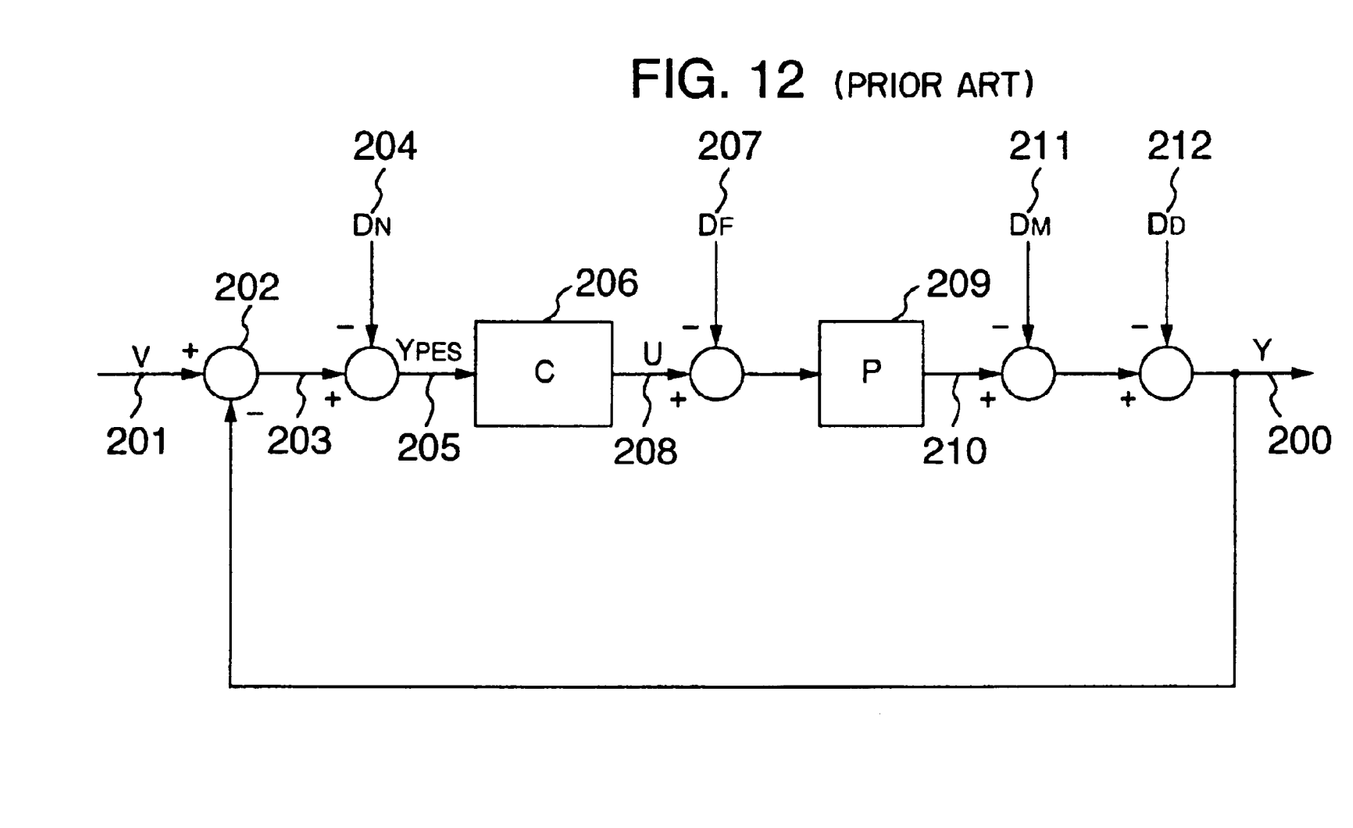
FIG. 12 is a block diagram showing the construction of a positioning control system of a coarse motion actuator in the conventional technique.

In the figure, an output of the control object P is added with the vibratory disturbance by the mechanical system and the position error disturbance and as a result, a head position Y 200 is settled. A head position is detected as head position error signal YPES 205 by demodulating a difference between the position Y 200 of the head of its own and position information V 201 recorded in advance on the disk. In this phase, the detection noise 204 is added. Typically, the controller C 206 is designed to take the form of a phase lead-lag compensator in order that the control object can be stabilized on the basis of the head position error signal and the bandwidth of the control system can be broadened. In FIG. 12, control operation purposes to determine the controller C capable of reducing the variance of detectable head position error signal YPES under the condition that the individual disturbances are applied. Here, a transfer function in a signal path ranging from the individual disturbances to the head position error signal 205 is given as below.

$$Y_{PES} = \frac{1}{1+PC}V + \frac{1}{1+PC}D_N + \frac{P}{1+PC}D_F + \frac{1}{1+PC}D_M + \frac{1}{1+PC}D_D \quad (1)$$

In equation (1), a sensitivity function S is defined as indicated by equation (2). As will be seen from equation (1), the sensitivity function indicates a compression ratio between the individual disturbances and the head position error signal and is also called a disturbance compressive characteristic.

$$S = \frac{1}{1+PC} \quad (2)$$

Thus, by purposefully stabilizing the control object P and raising the gain to broaden the band through the use of the controller C, denominator (1+PC) of the sensitivity function can be increased, thereby succeeding in compressing the disturbance components in the signal path ranging from the individual disturbances to the head position error signal YPES. This accounts for the fact that the high bandwidth of the control system is strongly desired.

Figure 13A:
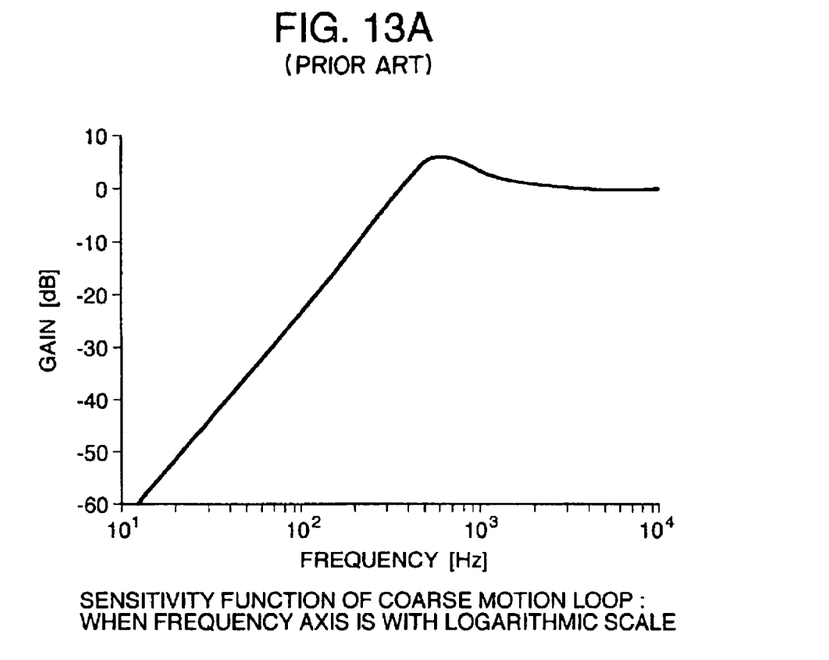
FIGS. 13A and 13B are graphs showing a frequency characteristic of the sensitivity function of the coarse motion actuator based on the conventional control technique.
Figure 13B:
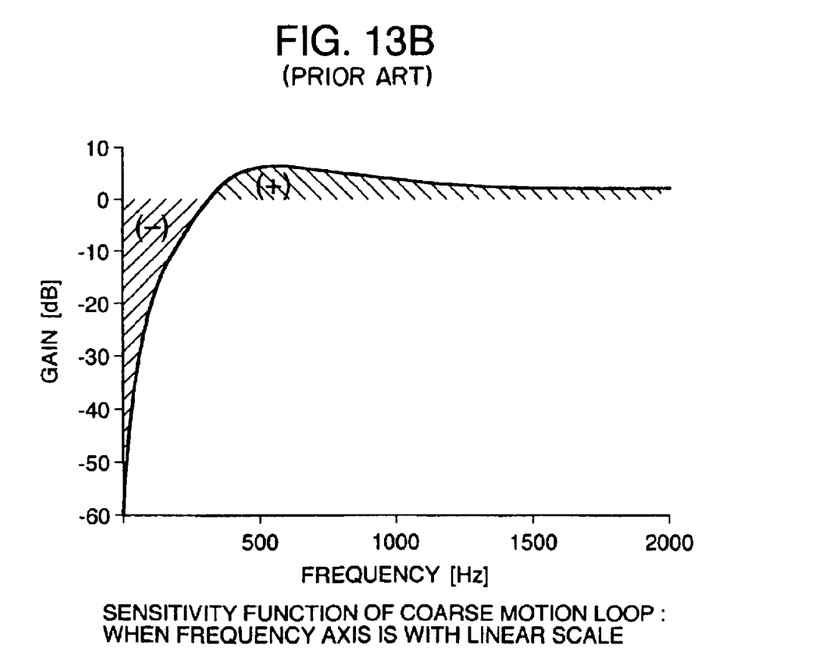

Referring to FIGS. 13A and 13B, an example of the sensitivity function S is graphically illustrated. A coarse motion actuator mechanism based on a voice coil motor is used as control object P and phase lead-lag compensation having a crossover frequency (control band) set to 500 Hz is used for the controller C. In FIG. 13A, abscissa is with the logarithmic scale. It will be seen from the figure that the sensitivity function exhibits on the one hand a characteristic being capable of compressing disturbances at frequencies of 350 Hz or less but on the other hand a characteristic being inclined conversely to amplify disturbances at frequencies of about 350 Hz to 3 KHz. For better understanding, the same abscissa for the sensitivity function as that in FIG. 13A is indicated in terms of linear scale in FIG. 13B. In this figure, an area (−) for compression of disturbance at frequencies of 350 Hz or less equals an area (+) for amplification of disturbance at frequencies of 350 Hz or more, as described in, for example, an article announced by Daniel Abramovitch et al in 1997 and entitled "The PES Pareto Method: Uncovering the Strata of Position Error Signals in Disk Drives", Proceeding of the American Control Conference, pages 2888–2895. This theory is widely known as the water bed effect, demonstrating properties that cannot be avoided in the quadratic feedback control system.

Figure 11:
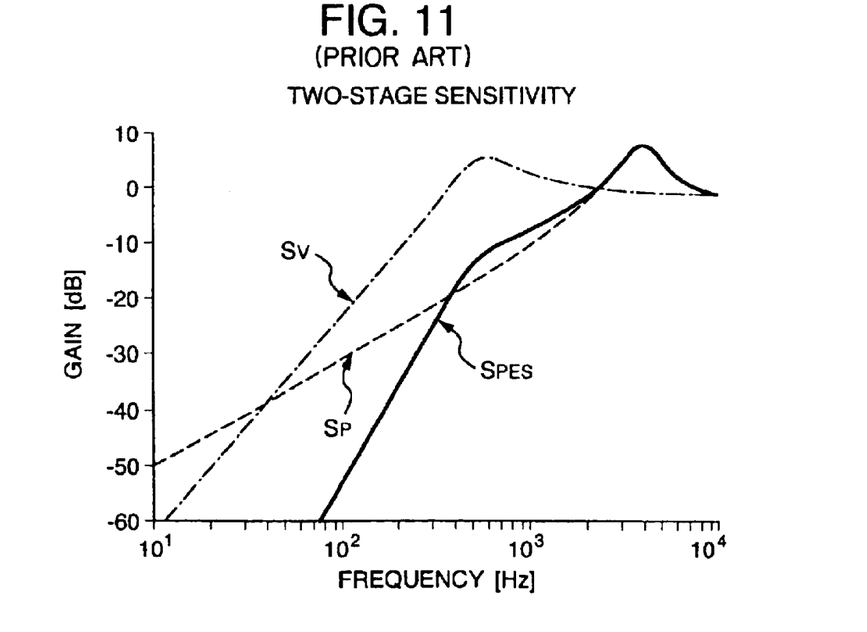
FIG. 11 is a graph showing a frequency characteristic of a sensitivity function of a positioning control system of two-stage actuator according to a conventional technique.

Turning to FIG. 11, there is illustrated, in graphical form, a sensitivity function of the control system of two-stage actuator construction shown in JP-A-4-368676. This sensitivity function (disturbance compressive characteristic) in the conventional control technique is indicated by the product of the sensitivity function of coarse motion actuator shown in FIGS. 13A and 13B and a sensitivity function of a fine motion actuator, exhibiting a characteristic that compresses disturbances in a band of 2 kHz or less and conversely amplifies disturbances at frequencies of 2 kHz or more. The present invention is to provide a control system capable of suppressing disturbances even in a high-frequency band. With this in mind, the present invention will be described.

Figure 1:
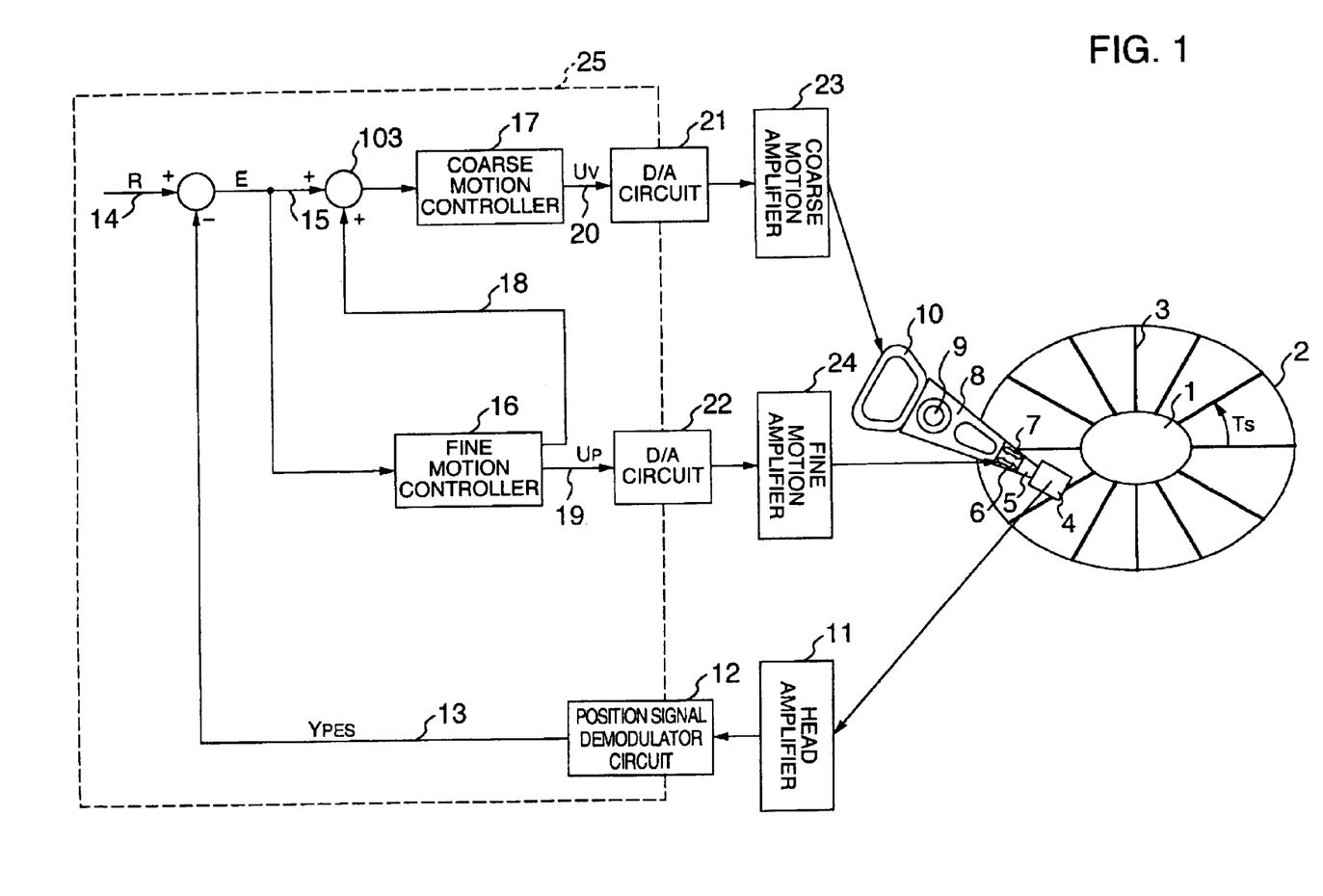
FIG. 1 is a diagram showing hardware construction of a disk apparatus according to a first embodiment of the invention.

Referring now to FIGS. 1 to 8, a first embodiment of the invention will be described. A magnetic disk apparatus of the present invention is constructed as shown in FIG. 1.

A spindle motor 1 rotates a magnetic disk 2 at a constant high speed. A sector of each track formed on the magnetic disk 2 is headed by position information 3 precedently recorded thereon. A magnetic head 4 is operative to read/write data from/to the opposing disk 2. The magnetic head 4 is resiliently supported by a suspension 5. The suspension 5 is driven over a small stroke by means of piezoelectric devices 6 and 7 constituting a fine motion actuator. A carriage 8 supports the piezoelectric devices 6 and 7. As the piezoelectric device 6 spreads and the piezoelectric device 7 contracts, the head 4 is slightly moved substantially toward the outer periphery on the disk 4. Conversely, as the piezoelectric device 7 spreads and the piezoelectric device 6 contracts, the head 4 is slightly moved in the opposite direction (toward the inner periphery).

The carriage 8 is driven over a large stroke integrally with the suspension by means of a voice coil motor 10 serving as a coarse motion actuator. As the voice coil motor 10 moves, the carriage pivoted on a pivotal shaft 9 moves from outer periphery to inner periphery of the disk 2 or vice versa. In the following, the piezoelectric devices will be described as representing the fine motion actuator and the voice coil motor as representing the coarse motion actuator.

The disk 2 is recorded in advance with the position information 3 every Ts time. Recorded as the position information 3 are a marker section indicative of the head of a sector, an AGC (automatic gain control) pull-in section, track numbers and a burst signal for detection of a relative position. The head 4 detects a difference between the position information recorded on the disk surface every Ts sampling time and a head position. The difference signal is amplified by a head amplifier 11 and is then demodulated by a position signal demodulator circuit 12 to generate a head position error signal YPES 13. The position signal is compared with a target position orbit R 14 to cause a controller 16 for fine motion actuator to calculate an operation quantity 19 of the fine motion actuator. In the typical following control condition, the target position orbit R is set to 0 (zero). The fine motion actuator is mechanically resonant at a high frequency of about 10 kHz. By providing the fine actuator controller 16 with an integral characteristic, the fine motion actuator can be operated stably.

Since the output of the fine motion actuator cannot be observed directly, its position is presumed through the observer method. In the case of the fine motion actuator using the piezoelectric devices, its contents ranging from input to output can be approximated by gain. Accordingly, the product of the output of the fine motion controller and the gain of the fine motion actuator is regarded as an output 18 of the fine motion actuator which in turn is added to a difference signal 15 applied to the coarse motion actuator. Even after the difference signal is rendered to be zero by means of the fine motion actuator, a controller 17 for coarse motion successively performs feedback control so as to reduce the amount of displacement of the fine motion actuator. Concomitantly therewith, the fine motion controller is also operated, so that the output of the fine motion actuator deceases while the head position error signal 13 remaining at the target position and in due time, becomes zero to keep the fine motion actuator at the central position within the movable range.

Operation quantities UP 19 and UV 20 are converted from digital quantities to analog quantities by means of D/A conversion circuits 22 and 21, respectively, and then sent to amplifiers 24 and 23 so that the piezoelectric devices 6 and 7 and the voice coil motor 10 may be driven. Design of the fine motion and coarse motion controllers for realizing the sensitivity function of the first embodiment in FIG. 1 will be detailed later. While in the foregoing the fine motion and coarse motion actuators have been described by way of example of the piezoelectric devices and the voice coil motor, any types of actuators may of course be employed provided that they can attain the respective objects.

Figure 2:
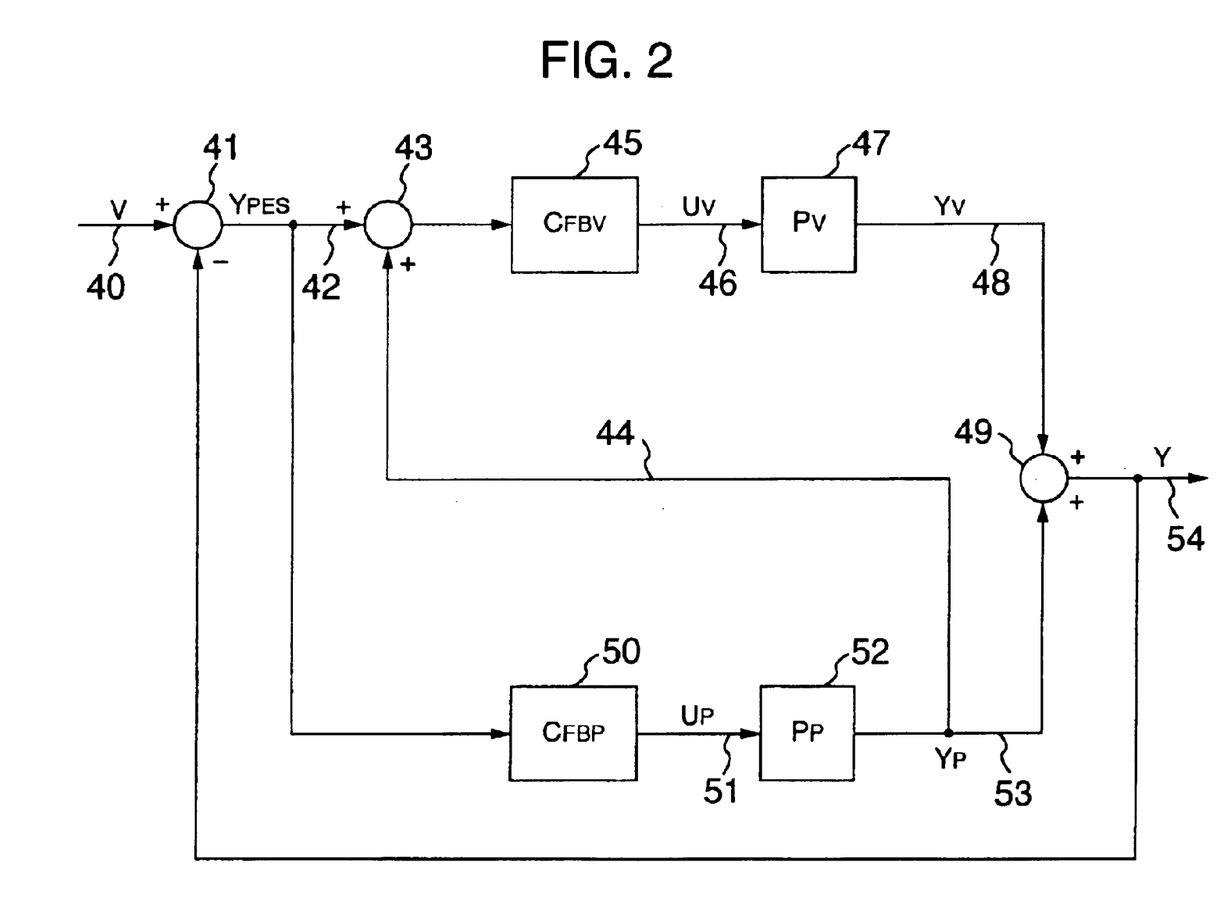
FIG. 2 is a block diagram showing an example of construction of a following control system in the first embodiment.

Turning to FIG. 2, there is illustrated, in block form, an example of a following control system in the first embodiment. In other words, the construction of hardware in FIG. 1 is shown in block diagram form. This construction shown in block diagram form is herein called a non-interference structure. In the figure, PP 52 represents a transfer function in a signal path ranging from the components covering D/A conversion circuit 22 and piezoelectric devices 6 and 7 to the output signal of fine motion actuator, and CFBP 50 represents a transfer function of the controller 16 for fine motion actuator. PV 47 represents a transfer function in a signal path ranging from the components covering D/A conversion circuit 21 and voice coil motor 10 to a characteristic of the carriage 8 and CFBV 45 represents a transfer function of the controller 17 for coarse motion actuator.

The illustration in FIG. 2 is based on the assumption that a displacement YP 53 of the fine motion actuator is detectable but in an actual system, direct detection of the displacement YP of the fine motion actuator is difficult to achieve. Accordingly, by taking advantage of the fact that the input and output of the piezoelectric device are related to each other in substantially proportional relationship, the displacement YP can be presumed by using an operation quantity UP 51 as shown in FIG. 2. Alternatively, the replacement YP can also be presumed by using, for example, the observer theory. The coarse motion actuator is driven to reduce the position error, whereas the fine motion actuator compresses a difference remaining owing to a failure to respond. Further, the coarse motion actuator is positioned in the center of the output position of the fine motion actuator. Through this, it is possible to make full use of the faculty of the fine motion actuator having a limited narrow stroke.

A transfer function in a signal path ranging from position information V 40 recorded on the disk surface to detectable head position error signal YPES 42 will be described with reference to FIG. 2. This transfer function is defined as a sensitivity function of the two-stage actuator control system and is also called a disturbance suppressive characteristic because it indicates a compressive ratio of disturbance.

$$Y_{PES} = \frac{1}{(1+P_V C_{FBV})(1+P_P C_{FBP})} V \quad (3)$$

For simplicity of illustration, the force disturbance DF 207, vibratory disturbance DM 211 of the mechanical system and positional disturbance DD 212 attributable to disk flutter and windage disturbance explained in connection with FIG. 12 are omitted in FIG. 2. Essentially, these disturbances are compressed through the aforementioned sensitivity function of the two-stage actuator as indicated by equation (1) and they remain in the position error signal YPES. Even the position information V 40 is not recorded in a truly circular form but has a vibratory component synchronous with rotation. The control system of the two-stage actuator compresses the influence of the position information V pursuant to equation (3) to prevent it from appearing in the head position error signal YPES.

When a typical feedback control system as shown in FIG. 12 is constructed by using the coarse motion actuator PV and the controller CFBV therefor, a transfer function in a signal path covering individual disturbances and head position error signal, that is, a sensitivity function SV in a coarse motion loop is given as below.

$$S_V = \frac{1}{1+P_V C_{FBV}} \quad (4)$$

On the other hand, when a typical feedback control system is constructed using the fine motion actuator PP and the controller CFBP therefor, a sensitivity function SP in a fine motion loop is given as below.

$$S_P = \frac{1}{1+P_P C_{FBP}} \quad (5)$$

Accordingly, it will be seen that in the non-interference structure shown in FIG. 2, equation (3) indicative of the sensitivity function of the two-stage actuator equals the product of equation (4) indicative of the sensitivity function in the coarse motion loop and equation (5) indicative of the sensitivity function in the fine motion loop. Accordingly, so long as each of the control systems for the fine motion and coarse motion actuators is so designed as to operate stably, the whole system of the two-stage actuator can operate stably, thus providing a characteristic which is very advantageous to design and adjustment of the servo system. This accounts for naming of the non-interference structure.

Figure 3:
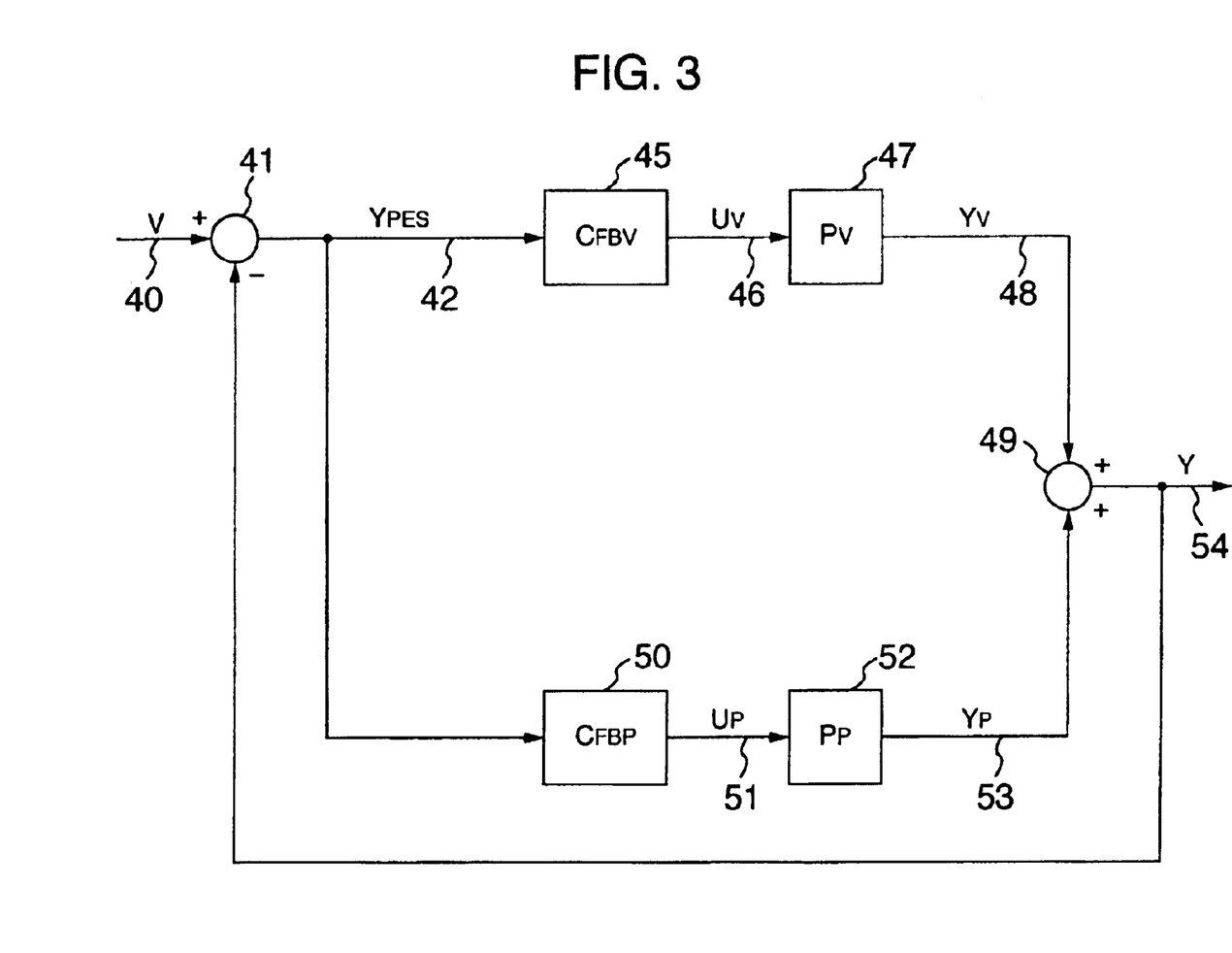
FIG. 3 is a block diagram showing another example of construction of the following control system in the first embodiment.

On the other hand, another example of the following control system in the first embodiment is illustrated in block form in FIG. 3. This control system differs from the system shown in FIG. 2 in that output 53 of the fine motion actuator is not fed back to the target value of the coarse motion controller 45. Thus, in this system, the coarse motion actuator loop is in parallel to the fine motion actuator loop to provide a so-called parallel structure. In the parallel structure, a transfer function in a signal path covering position signal V 40 recorded on the disk surface and head position error YPES 42 is given as below.

$$Y_{PES} = \frac{1}{1+P_V C_{FBV}+P_P C_{FBP}} V \quad (6)$$

The present first embodiment of the invention will be detailed hereinafter by way of the decouple structure and parallel structure of the following control system shown in FIGS. 2 and 3, respectively, but it should be understood that the structure of the following control system is not limitative in the present invention.

Figure 4:
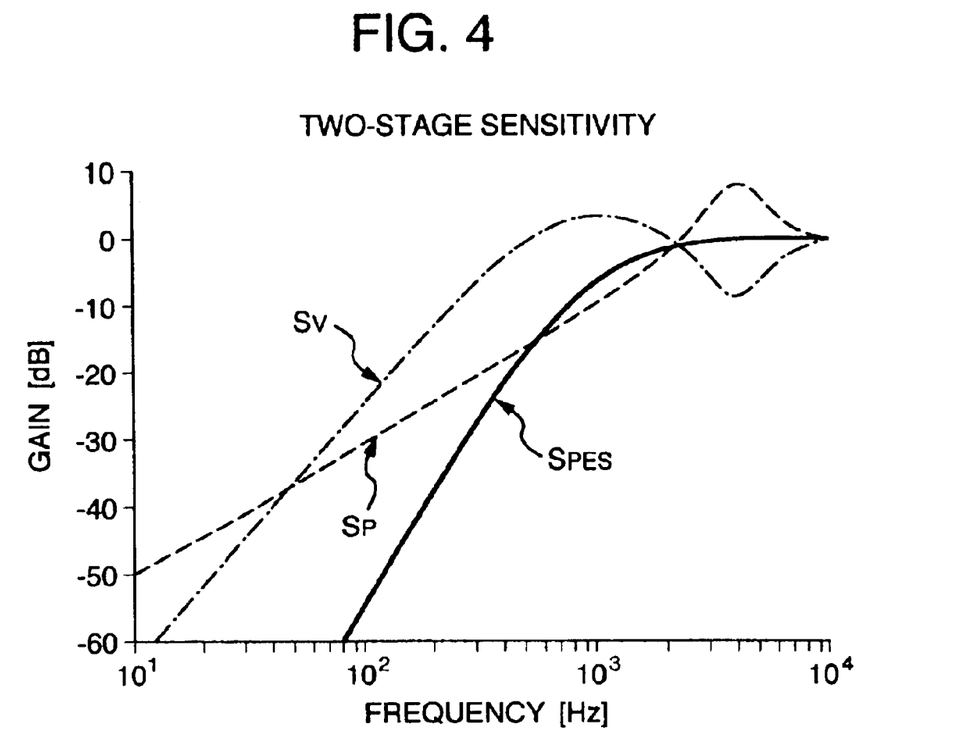
FIG. 4 is a graph showing a frequency characteristic of a sensitivity function based on a control technique in the first embodiment.

Referring to FIG. 4, there is illustrated, in graphical form, a frequency characteristic of the sensitivity function in the first embodiment. In the graph, SPES represents a sensitivity function of the two-stage actuator control system obtained through the present invention, SP represents a sensitivity function in the fine motion loop and SV represents a sensitivity function in the coarse motion loop. Firstly, a method for designing the sensitivity functions will be detailed with reference to the block diagram of FIG. 2. In case the controller 45 for fine motion is provided with an integral characteristic and the servo bandwidth constituted by the fine motion actuator DP 52 and controller CFBP 50 therefor is set to 2 kHz, the sensitivity function in the fine motion loop is obtained as indicated at SP in FIG. 4 in accordance with equation (5). It is assumed that in the controller for fine motion, the sampling time Ts is 50 μs and time for calculation is 25 μs. Thus, a zero-order hold characteristic and a phase-lag characteristic of an operation time delay cause the peak of the sensitivity function in the fine motion loop to rise. In other words, there results the conventional sensitivity function in which the disturbance component is compressed at frequencies of 2 kHz or less and conversely, the disturbance component is amplified at frequencies of 2 kHz or more.

Next, in designing the controller 45 for coarse motion, in addition to the conventional phase lead-lag compensation, the gain of the controller is raised, especially in a frequency band from 2 kHz to 8 kHz in order to decrease the sensitivity function within that band. In this phase, the servo band for the coarse motion loop is set to 500 Hz, thereby permitting the coarse motion loop to amplify disturbances at 500 Hz to 2 kHz but to compress disturbances at other frequencies. Then, the two-stage actuator has the sensitivity function SPES that is the product of sensitivity function SP in the fine motion loop and sensitivity function SV in the coarse motion loop. In other words, the sensitivity function in the fine motion loop has a raised form and the sensitivity function in the coarse motion loop has a converse characteristic centered on 0 db, thus ensuring that the sensitivity function of two-stage actuator system that is indicated by the product of the sensitivity functions in the fine and coarse motion loops can be set to 0 db or less. In this manner, according to the present invention, the sensitivity function is allowed to have the characteristic by which disturbances are not amplified at all of frequencies concerned.

Figure 5:
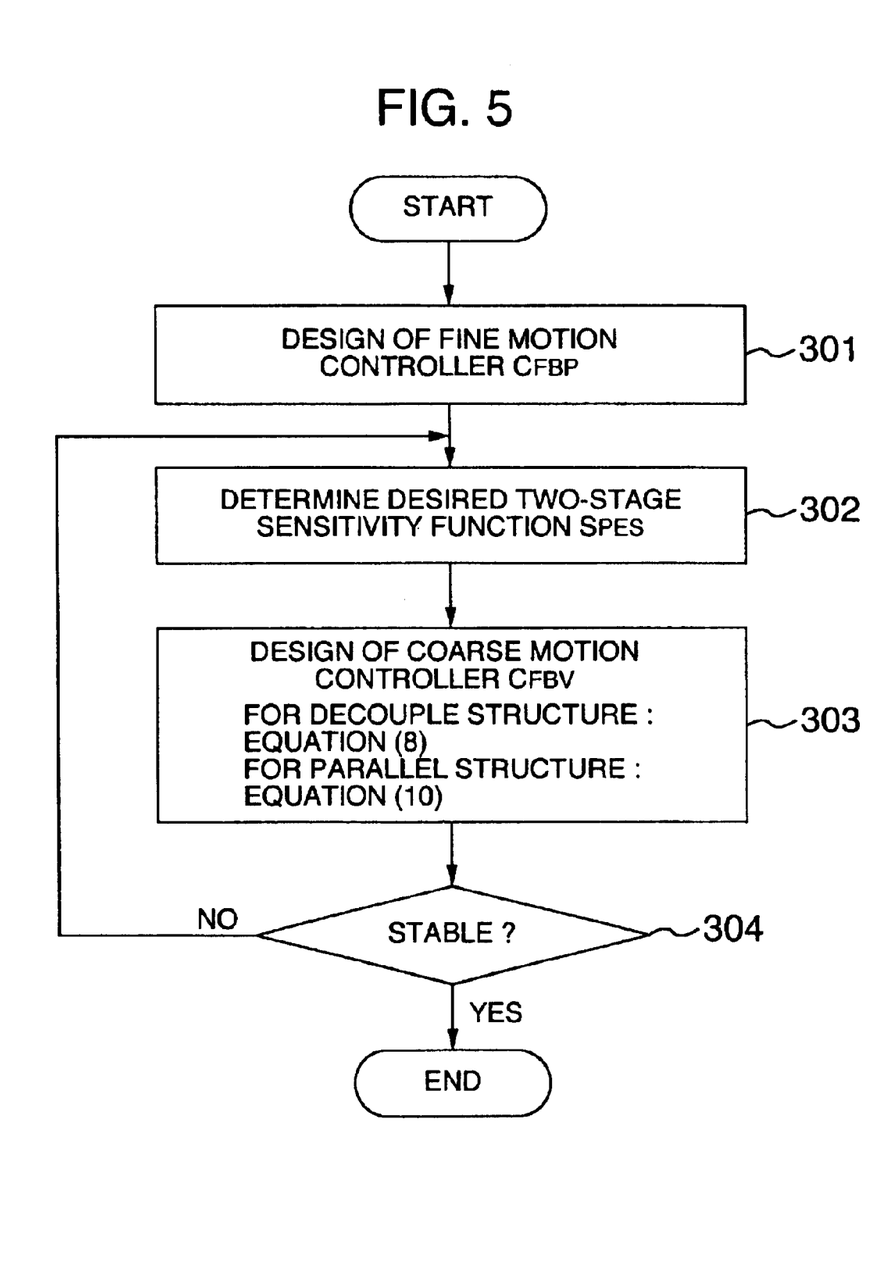
FIG. 5 is a flow chart showing design steps based on the control technique in the first embodiment.

The above design step in the invention will be described in greater detail with reference to FIG. 5 and equations.

Firstly, in the first step 301, the controller CFBP 50 for fine motion is designed. In this example, the piezoelectric actuator can be substantially approximated by the gain and stability is attained by the integral characteristic. The crossover frequency (servo band) is set herein to 2 kHz. Through this, the sensitivity function SP conforming to equation (5) is determined. Next, in the second step 302, a desired sensitivity function SMODEL of the two-stage actuator system is determined. Here, a structure, in which three linear high-pass compensators each having a fold-point frequency at 1 kHz are arranged in series, is used as the sensitivity function model SMODEL. This model is a combination of linear functions and therefore will not exceed 0 db at all of the frequencies. In the third step 303, the controller CFBV 45 for coarse motion is designed. With coincidence of the sensitivity function model with equations (5) and (6) in mind, the sensitivity function model is made to be equal to the product of the sensitivity functions of the fine motion and coarse motion controllers.

$$S_{MODEL} = \frac{1}{(1 + P_V C_{FBV})(1 + P_P C_{FBP})} \quad (7)$$

By solving the above equation for the coarse motion controller CFBV, there results $$C_{FBV} = \frac{1}{P_V}\left(\frac{1}{S_{MODEL}} \cdot \frac{1}{1 + P_P C_{FBP}} - 1\right) \quad (8)$$

Figure 6:
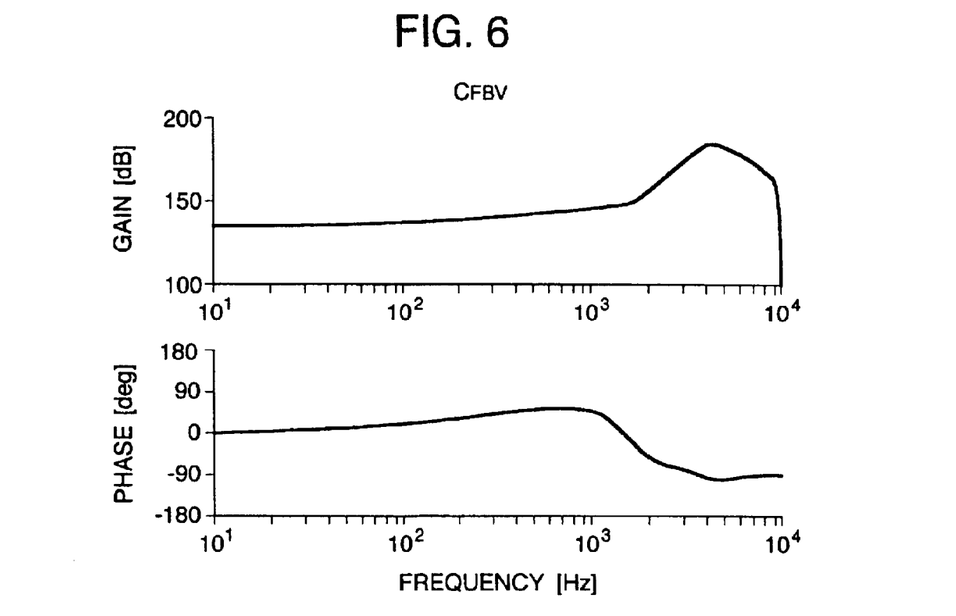
FIG. 6 is a graph showing a frequency characteristic of the coarse motion controller based on the control technique in the first embodiment.
Figure 7:
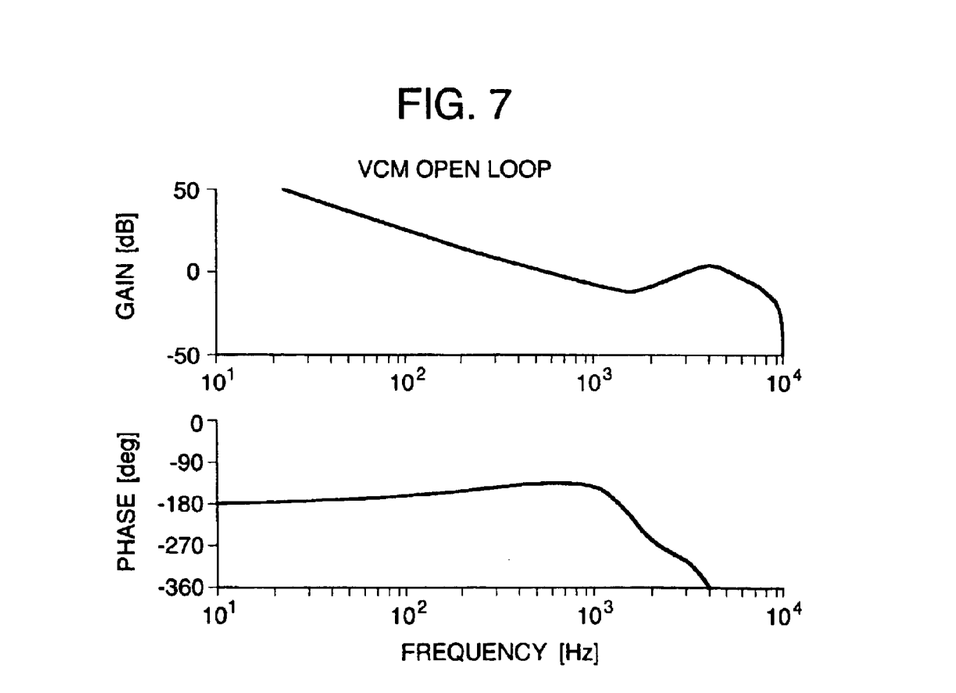
FIG. 7 is a graph showing a frequency characteristic of a closed loop system of coarse motion loop based on the control technique in the first embodiment.

A frequency characteristic of the coarse motion controller CFBV is graphically shown in FIG. 6.

In comparison with the conventional phase lead compensation, the gain is increased, especially at frequencies of about 2 kHz to 10 kHz. The increased gain leads to compression of disturbance components and eventually to a decrease in gain of the sensitivity function SV shown in FIG. 4 at frequencies from 2 kHz to 8 kHz.

Finally, in the fourth step 304, stability of the thus obtained control loop is examined. The controller for fine motion actuator has already been provided with the integral characteristic and is so designed as to operate stably by itself. Therefore, stability of only the coarse motion loop is required to be examined. To this end, the closed loop characteristic of the coarse motion actuator PV 47 and coarse motion controller CFBV 45 and the frequency characteristic of the PV and CFBV may conveniently be examined. A closed loop characteristic of the coarse motion loop is graphically illustrated in FIG. 7. The coarse motion controller designed in accordance with the procedures of the present invention has a servo band of about 650 Hz, a gain margin of 10 db and a peak portion of gain exceeding 0 db at about 4 kHz but the peak portion is near −360° as viewed from a phase characteristic, proving that the peak portion is stable. This accounts for the fact that the coarse motion loop is stable. As will be seen from the above, the sensitivity function of the two-stage actuator system designed according to teachings of the invention is practical and since disturbance components are not amplified at all of the frequencies, variance of the head position error signal YPES can be suppressed to a minimum. In addition, the influence of the position disturbance components due to increased disk rotation, which, in the conventional design, exist at near 2 kHz to 4 kHz and are responsible for increasing disturbance components in the control system, can be avoided and an excellent characteristic can be obtained.

The design procedures for realizing the sensitivity function of the first embodiment in the decouple structure shown in FIG. 2 have been described but in the case of the parallel structure shown in FIG. 3, equations (7) and (8) are reduced as below. Namely, in the case of the parallel structure, a desired sensitivity function SMODEL is related to equation (6) as below.

$$S_{MODEL} = \frac{1}{1 + P_V C_{FBV} + P_P C_{FBP}} \quad (9)$$

Then, by solving the above equation for the coarse motion controller CFBV 45, there results $$C_{FBV} = \frac{1}{P_V}\left(\frac{1}{S_{MODEL}} - 1 - P_P C_{FBP}\right) \quad (10)$$

Namely, in the fourth step, the structure is selected, a sensitivity function based on the thus selected structure is derived and a coarse motion controller for coincidence with the desired sensitivity function model is determined.

In the above example, the gain of the coarse motion controller CFBV is increased within the frequency band in which the sensitivity function in the fine motion loop exceeds 0 db but a similar operation can be carried out by using the gain of the coarse motion actuator. More specifically, the main resonance mode of the coarse motion actuator typically exists at about 4 kHz and therefore, its peak is kept to remain without being suppressed by a notch filter or the like for the purpose of attaining stabilization. By matching the peak frequency of the main resonance mode with a peak frequency at which the sensitivity function in the fine motion loop is raised, the sensitivity function of the two-stage actuator system can be prevented, to some extent, from being raised. By combining the main resonance mode of the coarse motion actuator with the controller for coarse motion, the sensitivity function of the two-stage actuator system can be shaped more easily.

Figure 8:
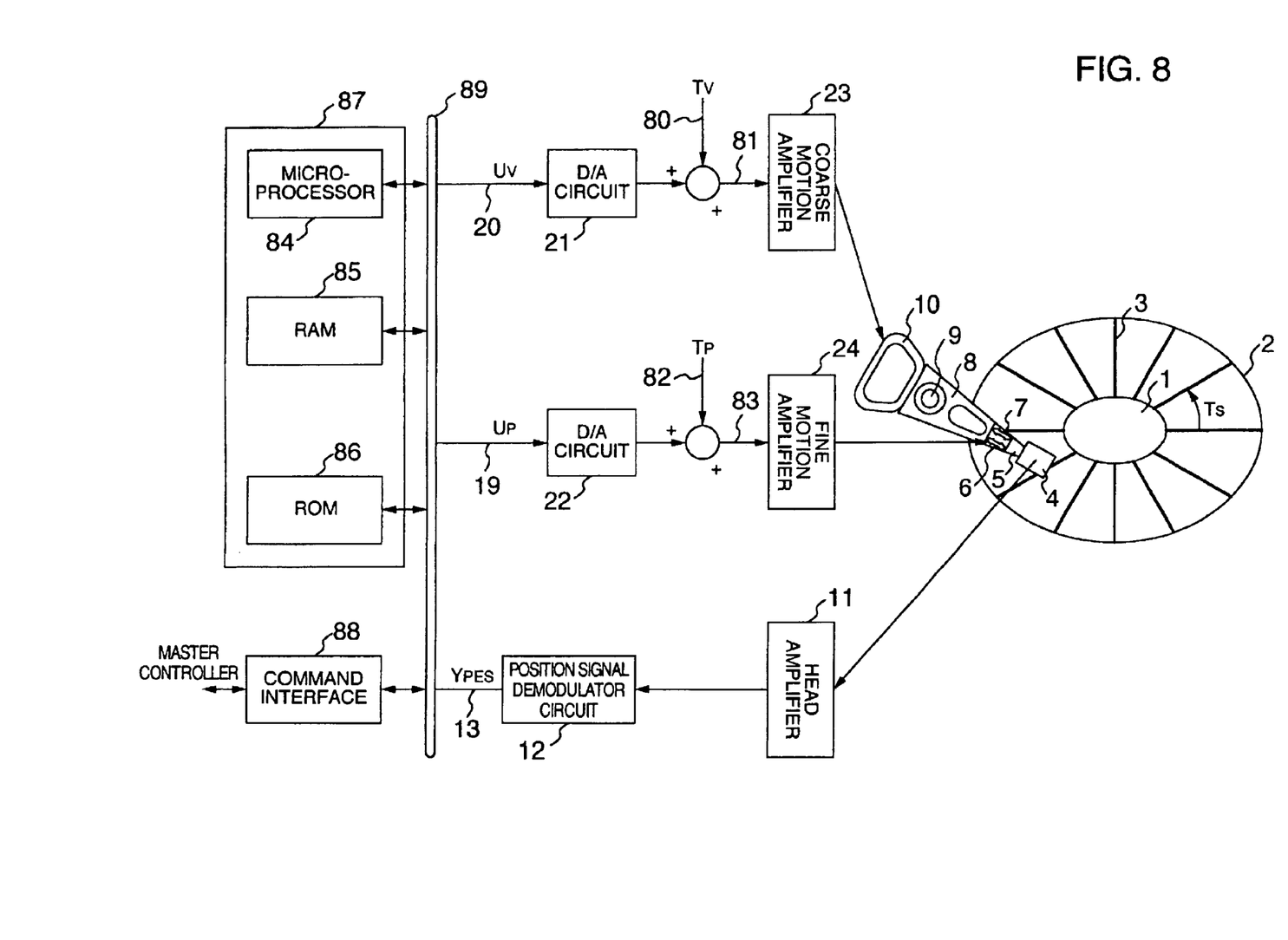
FIG. 8 is a block diagram showing the construction of a system for measuring the sensitivity function in the disk apparatus of the first embodiment.

Referring to FIG. 8, hardware for measuring and evaluating the individual sensitivity functions obtained by the disk apparatus of the first embodiment is constructed as shown therein. The hardware construction differs from the disk apparatus of FIG. 1 in that external input means TV 80 is interposed between the D/A circuit 21 and amplifier 23 for coarse motion and external input means TP 82 is interposed between the D/A circuit 22 and amplifier 24 for fine motion. Both the external input means are of analog signals to ensure measurement of an internal characteristic of the positioning control apparatus of the present invention.

An operating unit, generally designated by reference numeral 25, of the digital controller in FIG. 1 is implemented with a microprocessor system 87 in FIG. 8. The microprocessor system 87 has a microprocessor 84 coupled to RAM (random access memory) 85 and ROM (read only memory) 86 through a bus line 89. The ROM stores programs of various control systems. The RAM temporarily stores state variables and variable gains available in the control systems. The microprocessor executes operations of the various control systems to deliver an operation quantity 20 for driving the coarse motion actuator and an operation quantity 19 for driving the fine motion actuator. In the absence of signals from the external input means 80 and 82, the transfer function in the signal path ranging from target position command R to difference E in FIG. 1 has the same characteristic as the sensitivity function SPEC. Under the circumstances, the block 25 serves as the operation processing unit or microprocessor in the microprocessor system 87 and by inputting a sine wave as the target position command R, moving its frequency and graphically representing the gain ratio in the signal path ranging from the target position command R to the difference E, the sensitivity function SPEC of the positioning control system of the two-stage actuator system can be measured. But the block 25 represents the operation processing unit in the microprocessor system and therefore, a new program must be prepared in order to implement the above process.

Now, a method will first be described which utilizes the disturbance input means 80 and 82 to measure the sensitivity function through the use of an external measuring instrument. Firstly, the control input to the fine motion actuator is interrupted. Namely, the output of the fine motion controller 16 is rendered to be 0. Consequently, the head can be moved by means of the coarse motion actuator alone. In this phase, the sensitivity function SV in the coarse motion loop ranging from the external input means TV 80 to a signal 81 after addition is given by equation (4). Conversely, in case the coarse motion actuator is stopped and the head can be moved by means of the fine motion actuator alone, a sine wave is applied to the external input means TP 82 to ensure that the sensitivity function SP in the fine motion loop ranging from the external input means TP 82 to a signal 83 after addition can be measured. Typically, however, external force acts on the head and positioning of the head with only the fine motion actuator having the limited drive range is sometimes difficult to achieve.

Measurement of the sensitivity function SPEC of the two-stage actuator system based on the transfer function in the signal path ranging from the target position command R to the difference E has been described. Now, a method of measuring the sensitivity function SPEC by using the external input means will be described hereunder. In this method, a transfer function in a signal path ranging from the external input means TP 82 to a head position error signal 13 is measured. The error signal is related to the transfer function as below.

$$Y_{PES} = \frac{P_P}{(1 + P_V C_{FBV})(1 + P_P C_{FBP})} T_P \quad (11)$$

By comparing equation (4) with equation (11), it will be seen that the numerator in equation (11) contains the transfer function of the fine motion actuator. Accordingly, by subtracting from equation (11) a transfer function PP of the fine motion actuator measured separately, the sensitivity function of the two-stage actuator can be measured.

Figure 9:
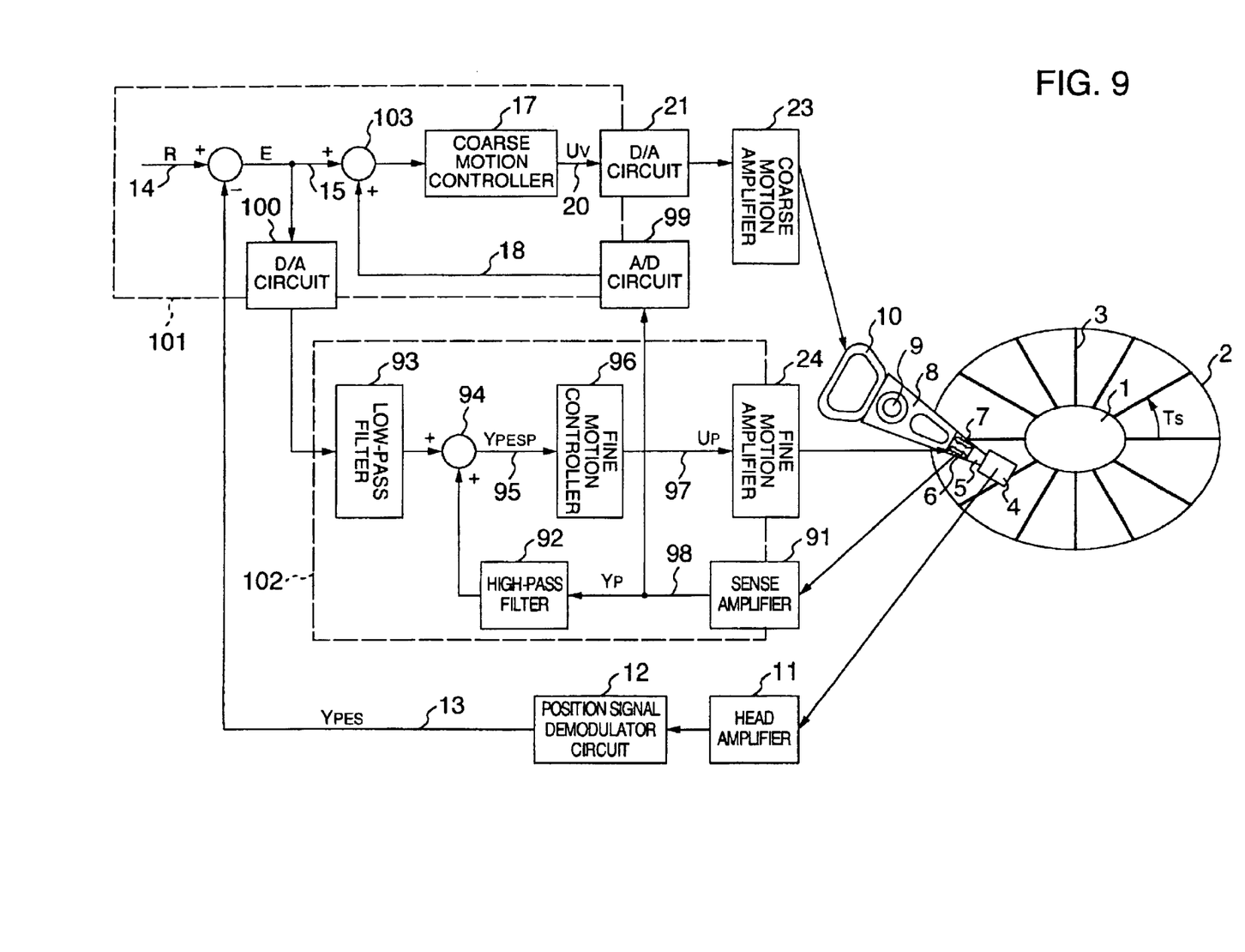
FIG. 9 is a block diagram showing hardware construction of a disk apparatus according to a second embodiment of the invention.
Figure 10:
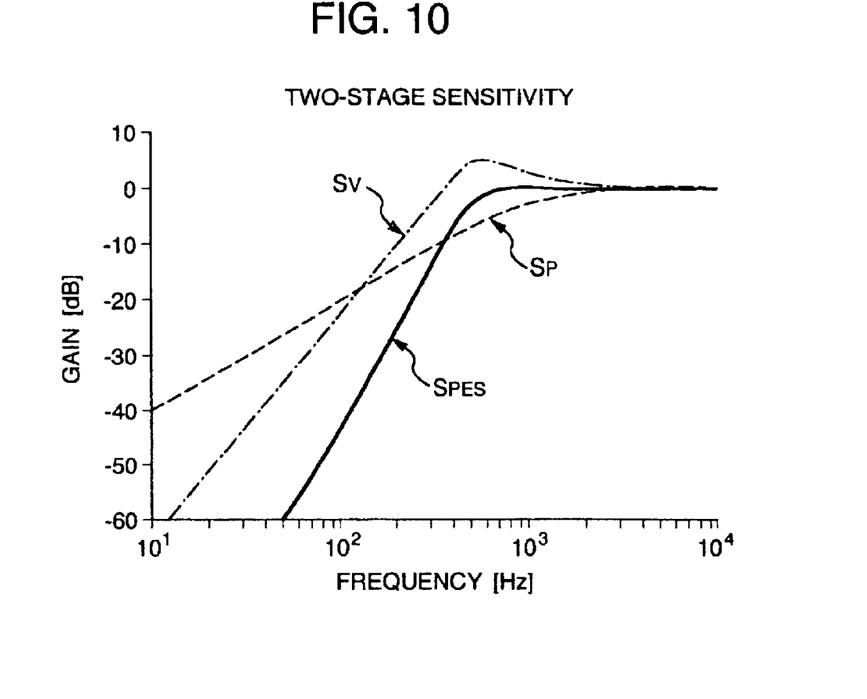
FIG. 10 is a graph showing a frequency characteristic of a sensitivity function based on a control technique in the second embodiment of the invention.

Referring now to FIGS. 9 and 10, a disk apparatus according to a second embodiment of the invention for realizing the flat sensitivity function of the invention is constructed as shown therein. Essentially, the coarse motion control loop is operated with a digital circuit 101 and the fine motion control loop is operated with an analog circuit 102. Advantageously, with the fine motion loop constructed in the form of the analog circuit, lagging in the loop and raising of the sensitivity function in the fine motion loop can be prevented.

The fine motion loop analog circuit 102 is constructed as below. The displacement of the piezoelectric devices is detected and amplified by a sense amplifier 91. Essentially, the piezoelectric device is formed of a capacitor and therefore, an electric charge stored in the piezoelectric device can be stored in a capacitor in the sense amplifier. By measuring a potential difference across the capacitor, a displacement quantity of the piezoelectric device can be measured. The displacement YP 98 of the fine motion actuator is passed through a high-pass filter 92 to permit only a high-frequency component of the displacement to pass therethrough. On the other hand, a position error signal 13 measured at the Ts sampling time is D/A converted and passed through a low-pass filter 93 to derive only its low-frequency component which in turn is added to the output of the high-pass filter by an adder 94 to generate a continuous head position error signal YPESP 95. The head position error signal YPES 13 contains the displacement quantity of the fine motion actuator but the operating band of the fine motion actuator is at a relatively high frequency and hence only the low-frequency component of the coarse motion actuator can be taken out by passing the error signal through the low-pass filter 93.

The continuous head error position signal 95 is applied to a controller 96 for fine motion and sent to an amplifier 24 for fine motion so as to drive the piezoelectric devices 6 and 7 constituting the fine motion actuator. On the other hand, the displacement of the fine motion actuator needs to be fed back to a target value of the coarse motion controller and therefore, it is A/D converted by an A/D conversion circuit 99 and then sent to the digital circuit 101. The above construction has, as its fundamental construction, the following control system of decouple structure shown in FIG. 3 but it may be based on the fundamental construction of the parallel structure shown in FIG. 4. In this case, signal line 18, A/D converter 99 and adder 103 can be dispensed.

An example of frequency response of the sensitivity function of the two-stage actuator system constructed as shown in FIG. 9 is graphically illustrated in FIG. 10. In this example, the servo band of the coarse motion loop is set to 500 Hz and the servo band of the fine motion loop is set to 1 kHz. The sensitivity function SV in the coarse motion loop has a raise. On the other hand, the sensitivity function SP in the fine motion loop is constructed of the analog circuit and hence has no raise. As a result, the sensitivity function SPES of the two-stage loop indicated by the product of these sensitivity functions is devoid of raise. With this construction, it can be confirmed that by setting the band of the fine motion loop to 1 kHz or more, the sensitivity function of the two-stage actuator system can realize 0 db or less at all of the frequencies.

While in the foregoing embodiments the magnetic disk apparatus is adopted, the present invention can be realized in a similar way even when another memory medium such as for example an optical disc or DVD-RAM is employed. The optical disc or the DVD apparatus is a preferable example for which the coarse motion and fine motion actuators are provided so that the first or the second invention may be applied. Further, even in a positioning controller having more than two actuators, the present invention can be realized for similar reasons.

In the present embodiment, the fine motion actuator has been described as being of the piezoelectric devices but in the present invention, other driving devices, for example, an electromagnetic actuator or an electrostatic actuator can substitute for.

Even in a three-stage actuator having a coarse motion actuator, a fine motion actuator and a very fine motion actuator of less weight and high response capability, the flat sensitivity function can be practiced in a similar way by replacing the fine motion actuator of the three-stage actuator with the coarse motion actuator of the previously-described embodiment and the very fine motion actuator of the three-stage actuator with the fine motion actuator of the previous embodiment. In other words, the number of the actuators does not restrict the present invention.

The foregoing embodiments have been described by using specified numerical values but these numerical values do not restrict the present invention.

Finally, in the foregoing embodiments, the sensitivity function of the two-stage actuator system has been described as not being in excess of 0 db (gain 1) but the numerical value of 0 db is not meaningly essential in the present invention and the essence of the present invention resides in that the peak gain value of the sensitivity function of the two-stage actuator system can be reduced by carrying out the present invention. More specifically, the conventional peak gain value has been known as being between 7 dB (2.24 times) and 10 db (3.16 times) but according to the present invention, the peak value can be reduced to approximately 0 db (1 times) to 3 dB (1.41 times), leading to improvements in the performance of the apparatus. To describe, if the peak gain can be reduced essentially by the present invention even in the presence of a sharp singular peak exists at 0 db or 3 dB or more, the apparatus performance can obviously be improved drastically, demonstrating that the essence of the present invention is not changed by the presence of the singular peak.

In the present invention, there are provided the disk apparatus and positioning control system in which the fine motion actuator of high response and small stroke cooperates with the coarse motion actuator of low response and large stroke to realize highly accurate positioning operation. According to the present invention, the sensitivity function in the signal path ranging from the disturbance components to the head position error signal can be shaped and the flat sensitively function can be realized which does not amplify disturbances at all of the frequencies.

In other words, in the first embodiment, by reducing the gain of the sensitivity function of coarse of the sensitivity function of positioning control system of the fine motion actuator exceeds 0 dB, the sensitivity function of the two-stage actuator control system can be rendered to be 0 dB or less at all of the frequencies. In the second embodiment, by constructing the fine motion actuator control system in the form of an analog circuit, lagging in operation time can be avoided and the gain of the sensitivity function of positioning control system can be rendered to be 0 dB or less at all of the frequencies.

The frequencies band in which the disturbance is amplified exists in the conventional art, whereas the disturbance can be compressed at all of the frequencies according to the present invention. Through this, highly accurate positioning of the head can be ensured, the track pitch distance can be narrowed and a large amount of data can be recorded on one disk surface, thereby permitting capacity of the apparatus to be increased.

What is claimed is:

1. A head positioning apparatus comprising a coarse motion actuator having a stroke for permitting a head for recording/reproduction of information to operate over the whole of a disk, a controller for coarse motion adapted to drive said coarse motion actuator, a fine motion actuator movable by said coarse motion actuator and having its stroke limited to a small value and a controller for fine motion adapted to drive said fine motion actuator, wherein a position difference signal determined by comparing a head position signal of said head with a target position is fed back to both said coarse motion controller and said fine motion controller so as to partly increase the gain of said coarse motion controller within a frequency region exceeding a positioning control band of said fine motion actuator; and wherein a sensitivity function in a coarse motion loop has a converse characteristic to a raised form characteristic of a sensitivity function in a fine motion loop.

2. A head positioning apparatus according to claim 1, wherein a gain characteristic of a sensitivity function indicative of a disturbance suppressive characteristic in a signal path ranging from said target position to said position difference signal is rendered to be 1.4 or less at all frequencies concerned.

3. A head positioning apparatus comprising a coarse motion actuator as represented by PV having a stroke for permitting a head to operate over the whole of a disk, a controller for coarse motion as represented by CFBV adapted to drive said coarse motion actuator, a fine motion actuator as represented by PP movable by said coarse motion actuator and having its stroke limited to a small value and a controller for fine motion as represented by CFBP adapted to drive said fine motion actuator, said head being positioned finely by means of said fine motion actuator, wherein a position difference signal determined by comparing a head position signal obtained through detection of the position of said head with a target position is fed back to both said coarse motion controller and said fine motion controller so as to add a displacement quantity of said fine motion actuator to said coarse motion controller and the gain of a sensitivity function $1/(1+PV \cdot CFBV)$ of coarse motion loop indicative of a disturbance suppressive characteristic of said coarse motion actuator and coarse motion controller is rendered to be 1 or less within a frequency region in which the gain of a sensitivity function $1/(1+DP \cdot CFBP)$ of a fine motion loop indicative of a disturbance suppressive characteristic of said fine motion actuator and fine motion controller is rendered to be 1 or more; and wherein a sensitivity function in a coarse motion loop has a converse characteristic to a raised form characteristic of a sensitivity function in a fine motion loop.

4. A head positioning apparatus comprising a coarse motion actuator having a stroke for permitting a head for recording/reproduction of information to operate over the whole of a disk, a controller for coarse motion adapted to drive said coarse motion actuator, a fine motion actuator movable by said coarse motion actuator and having its stroke limited to a small value and a controller for fine motion adapted to drive said fine motion actuator, wherein a position difference signal determined by comparing a head position signal, obtained by detecting the position of said head every constant time, with a target position is fed back to said coarse motion controller and wherein means for detecting a displacement of said fine motion actuator and means for generating a continuous head position signal from a high-frequency component of the continuous displacement of said fine motion actuator and a low-frequency component of the discrete position difference signal are provided so as to feed said continuous head position signal back to said fine motion controller; and wherein a control band of a fine motion loop is set to be higher than a control band of a coarse motion loop.

5. A head positioning apparatus according to claim 4, wherein a gain characteristic of a sensitivity function indicative of a disturbance suppressive characteristic in a signal path ranging from said target position to said position difference signal is rendered to be 1.4 or less at all frequencies concerned.

6. A head positioning apparatus comprising a coarse motion actuator having a stroke for permitting a head for recording/reproduction of information to operate over the whole of a disk, a controller for coarse motion adapted to drive said coarse motion actuator, a fine motion actuator movable by said coarse motion actuator and having its stroke limited to a small value and a controller for fine motion adapted to drive said fine motion actuator, wherein a position difference signal determined by comparing a head position signal obtained through detection of the position of said head with a target position is fed back to both said coarse motion controller and said fine motion controller, and a peak frequency of a sensitivity function indicative of a disturbance suppressive characteristic of said fine motion actuator and fine motion controller is rendered to be substantially coincident with a frequency of a main resonance peak of said coarse motion actuator.

* * * * *